(12) United States Patent
Darroch

(10) Patent No.: US 9,599,117 B2
(45) Date of Patent: Mar. 21, 2017

(54) BACK PRESSURE RELIEF MOTOR CONTROL FOR A NON-BLEEDER TURBINE STYLE HVLP SPRAY GUN

(71) Applicant: John A. Darroch, Vista, CA (US)

(72) Inventor: John A. Darroch, Vista, CA (US)

( * ) Notice: Subject to any disclaimer, the term of this patent is extended or adjusted under 35 U.S.C. 154(b) by 343 days.

(21) Appl. No.: 14/209,571

(22) Filed: Mar. 13, 2014

(65) Prior Publication Data
US 2014/0271230 A1    Sep. 18, 2014

Related U.S. Application Data

(60) Provisional application No. 61/786,152, filed on Mar. 14, 2013.

(51) Int. Cl.
*F04D 27/00* (2006.01)
*B05B 7/00* (2006.01)
*B05B 7/24* (2006.01)

(52) U.S. Cl.
CPC .......... *F04D 27/004* (2013.01); *B05B 7/0081* (2013.01); *B05B 7/2416* (2013.01)

(58) Field of Classification Search
CPC ...................................... B05B 7/2416
USPC ......................... 239/290–301, 526
See application file for complete search history.

(56) References Cited

U.S. PATENT DOCUMENTS

| 3,860,363 | A  | * | 1/1975  | Silvern ............... | F04B 39/0207 417/12 |
| 5,074,467 | A  | * | 12/1991 | Geberth ............... | B05B 7/0081 200/81.9 R |
| 2006/0127227 | A1 | * | 6/2006  | Mehlhorn ............. | F04D 27/004 417/53 |
| 2007/0275615 | A1 | * | 11/2007 | Norton .................. | A63B 41/12 441/90 |
| 2011/0255992 | A1 | * | 10/2011 | Tran ...................... | F04B 49/065 417/1 |

* cited by examiner

*Primary Examiner* — Devon Kramer
*Assistant Examiner* — Kenneth J Hansen
(74) *Attorney, Agent, or Firm* — Hackler Daghighian Martino & Novak

(57) ABSTRACT

A high volume low pressure (HVLP) turbine assembly includes a housing having a turbine which includes a turbine fan rotatable within a turbine casing. A microcontroller is disposed within the housing, where the microcontroller controls a speed of an electric motor powering the turbine fan. A pressure sensor and an airflow sensing means is in airflow communication with a turbine air outlet. The HVLP turbine assembly does not have a bleeder port in airflow communication with the turbine air outlet. Rather, the microcontroller is configured to reduce the speed of the electric motor to an idle speed after a predetermined time has elapsed, wherein the predetermined time is started when the airflow sensing means indicates a period of inactivity.

20 Claims, 6 Drawing Sheets

BACK PRESSURE RELIEF MOTOR CONTROL FOR A NON-BLEEDER TURBINE STYLE HVLP SPRAY GUN

CROSS-REFERENCE TO RELATED APPLICATIONS

This non-provisional application claims priority to provisional application 61/786,152 filed on Mar. 14, 2013, the contents of which are fully incorporated herein with this reference.

DESCRIPTION

Field of the Invention

The present invention generally relates to spray guns used for painting. More particularly, the present invention relates to a back pressure relief motor control for a non-bleeder turbine style HVLP spray gun.

Background of the Invention

Air gun spraying is a process where paint (or some medium) is applied to an object through the use of an air-pressurized spray gun. The air gun has a nozzle, paint basin, and air compressor. When the trigger is pressed the paint mixes with the compressed air stream and is released in a fine spray.

There are two basic types of finishing spray guns available on the market. The traditional system is a conventional spray gun system that operates at a relatively high pressure. The air gun is connected to an air compressor and the finish/paint is blasted onto the work piece under high pressure. Because this high pressure finely atomizes the spray, in that it produces very fine particles, this gives a very nice smooth application, whether it be a clear shellac, varnish or paint. Despite this excellent end result, conventional spray guns have only about a 30% transfer efficiency meaning that 30% of the finish actually ends up where it's supposed to go, on the substrate. The other 70% is released to the atmosphere as overspray. This both wastes material and is detrimental to the environment as well.

The second type of system are newer systems that utilize a high volume, low pressure spray gun. These are known as HVLP systems, which accordingly stands for high volume, low pressure. HVLP guns increase transfer efficiency, which means that much more of the spray medium is actually transferred to the work piece instead of being wasted as overspray. Unfortunately, many of the solvents used today in various industries are detrimental to air quality. Therefore, not only is it industry standard in some industries to use HVLP spray guns, but it is actually mandatory to use the HVLP spray guns, as ordered many local governments and state.

There are generally two different types of HVLP spray gun systems on the market. The first utilizes pre-existing equipment, because it converts the traditional spray gun system into a HVLP system. This is known as a "conversion HVLP spray gun." With this system, the spray gun still runs off an air compressor just as a conventional spray gun does, but it uses much lower pressure, about 25 pounds per square inch. It's not as efficient as the newer turbine air system, but it is still much better than a conventional spray gun and is a cost-effective alternative for someone who already owns an air compressor.

The second type of HVLP spray gun is the most efficient, and this is suitable for someone who doesn't already own an air compressor. This spray gun operates off of an air turbine instead of an air compressor. This delivers an extremely high volume of air at very low pressure, about four to six pounds per square inch, flow pressure. The turbine system is generally more costly than an air compressor, but because it is so much more efficient it is worth the investment for many professional shops.

A turbine style spray gun system has a turbine fan that is spun by an electric motor. The most powerful turbines for use today are 5 stage turbine fans. This means that there are 5 sets of fan blades that comprise the whole fan. This provides the highest volume of air flow while still being below 10 psi. The 5 stage turbine fans are limited to only produce a maximum of 10 psi. This limit is set by the construction of the fan turbine itself and also by law.

When air is compressed, it creates heat. The air inside of a turbine for an HVLP is also creating heat. This heat must be dissipated or else the fan assembly will overheat and bearing failure or turbine failure will occur. A secondary fan system may be used to aid in cooling by flushing the outside of the turbine casing and electric motor with fresh air. However, this secondary fan system is still not sufficient to remove all of the heat inside of a turbine fan.

Accordingly, most turbine style HVLP spray gun systems incorporate some form of a bleeder valve or bleeder relief in the pressurized air system. The bleeder may be in the spray gun or near the electric motor assembly. The bleeder allows the electric motor to continuously run when the spray gun is not in use and prevents the electric motor from overheating. The bleeder allows heated air inside the core of the turbine to be released on a continuous basis.

However, a pressure differential is lost and wasted due to the bleeder valve. This lost pressure differential can have a negative affect on the quality or ability of the spray gun to work properly or at an optimum level. While the pressure differential lost due to the bleeder valve may seem small, such as 1 to 0.5 psi, this can have a dramatic impact on the quality of the spray delivered at the spray gun itself. This is because the pressure at the outlet of the turbine assembly is typically only 9.5 psi and by the time it reaches the spray gun it may be at 6 psi during flow. Having an extra 1 to 0.5 psi back at the spray gun is a large improvement in the quality of the spray being delivered.

Accordingly, there is a need for a HVLP spray gun system that allows the electric motor to run when the spray gun is not in use which does not cause the electric motor and turbine to overheat while also not wasting bleeder/relief pressure when the spray gun is in use. The present invention fulfills these needs and provides other related advantages.

SUMMARY OF THE INVENTION

A high volume low pressure (HVLP) turbine assembly includes a turbine assembly housing. A turbine is disposed within the housing, where the turbine includes a turbine fan rotatable within a turbine casing. The turbine casing has a turbine air inlet and a turbine air outlet. A hose outlet fitting is connected to the housing, where the hose outlet fitting is in airflow communication with the turbine air outlet and where the hose outlet fitting is configured to be connectable to an air hose for a spray gun. An electric motor is mechanically coupled to the turbine fan and configured to rotate the turbine fan inside the turbine casing. A microcontroller is disposed within the housing, where the microcontroller is electrically connected to the electric motor and controls a speed of the electric motor. A power input is electrically coupled to the microcontroller. A pressure sensor is in airflow communication with the turbine air outlet where the pressure sensor is electrically connected to the microcontroller. An airflow sensing means is in airflow communication with the turbine air outlet where the airflow sensing means is also electrically connected to the microcontroller. A timer is electrically connected to the microcontroller. The HVLP turbine assembly does not have a bleeder port in airflow communication with the turbine air outlet, where the bleeder port would be configured to exhaust outwardly. The microcontroller is configured to reduce the speed of the electric motor to an idle speed after a predetermined time has elapsed, wherein the predetermined time is started when the airflow sensing means indicates a period of inactivity.

In other exemplary embodiments, the microcontroller may include a proportional-integral-derivative loop controlling the electric motor and may be configured to maintain a constant output pressure under a variable demand load.

The airflow sensing means may include monitoring an error term of the proportional-integral-derivative loop, wherein the period of inactivity is indicated by the error term settling to substantially zero.

The pressure sensor may include a piezo-electric pressure sensor.

The idle speed may correspond to less than or equal to 2.5 psi of pressure in the turbine air outlet.

The microcontroller may be configured to increase the speed of the electric motor from the idle speed when an abrupt change in the error term of the proportional-integral-derivative loop is detected. The abrupt change in the error term of the proportional-integral-derivative loop may include an adjustment of a pressure setpoint by the operator or a trigger pull on a spray gun connected to the hose outlet fitting.

A temperature sensor may be attached to the turbine casing where the temperature sensor may be electrically connected to the microcontroller. The microcontroller may be configured to turn off the electric motor if the temperature sensor senses an operating temperature above a predefined temperature threshold.

The temperature sensor may be a thermistor.

A graded switch control may be connected to the housing and be controllable by the operator, where the graded switch control is electrically connected to the microcontroller and controls the speed of the electric motor.

An auxiliary cooling fan may be mechanically coupled to the electric motor, where the auxiliary cooling fan is in airflow communication with an auxiliary cooling fan inlet disposed in the housing, and where the auxiliary cooling fan is configured to provide airflow to the electric motor and/or turbine casing.

An air filter may be coupled to the turbine air inlet and configured to filter incoming air. A second air filter may be coupled to the auxiliary cooling fan inlet configured to filter incoming air.

The predetermined time may be 5, 10, 15, 20, 25, 30 or 60 seconds or any combination thereof.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
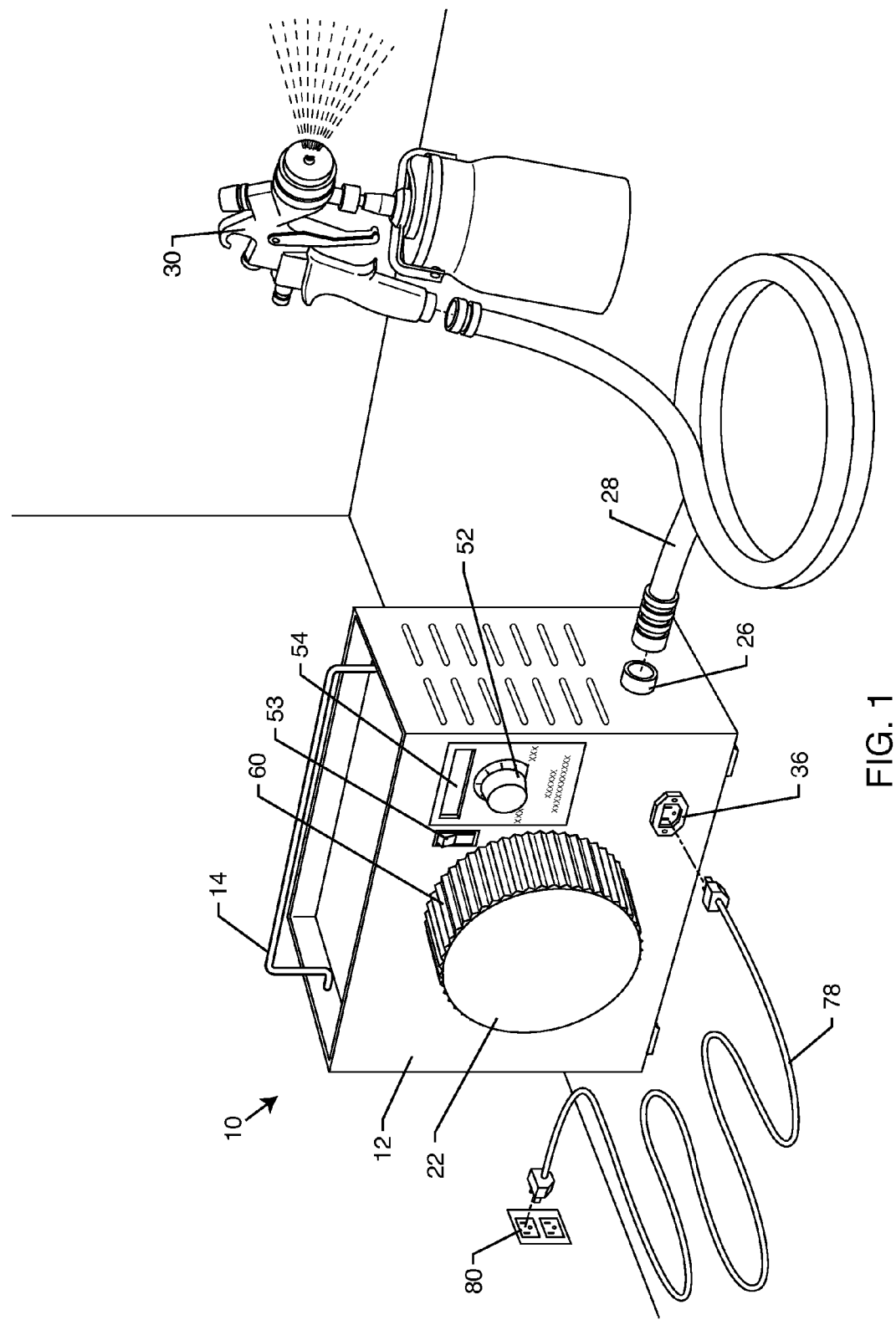
FIG. 1 is a perspective view of an exemplary HVLP spray gun system embodying the present invention.
Figure 2:
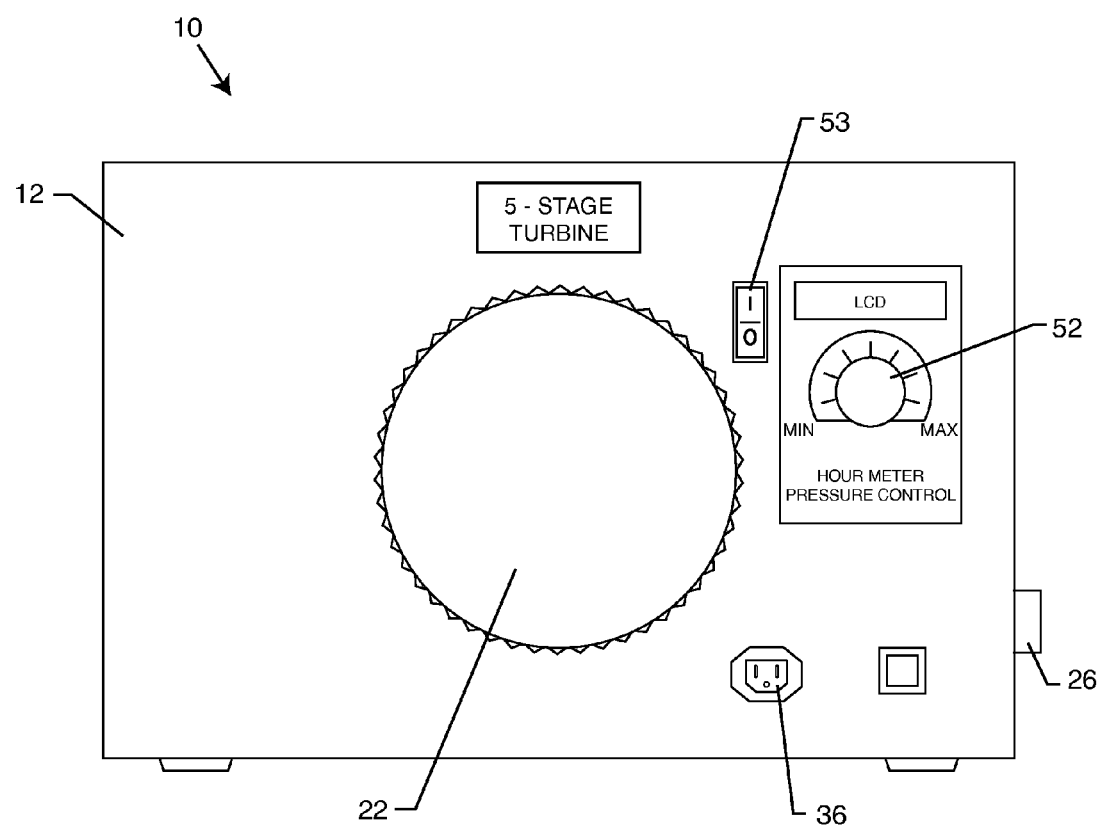
FIG. 2 is front view of the turbine assembly of FIG. 1.

A microcontroller-based feedback controller for a high volume, low pressure (HVLP) turbine has been developed and is disclosed herein. The turbine fan is driven by an electric motor whose power is adjusted using a traditional phase controlled TRIAC. The TRIAC is fired by the microcontroller which is synchronized to the power mains using a zero-cross detection circuit. Both 50 and 60 Hz operation on 120 VAC and 240 VAC power mains is supported.

A novel feature of the controller is the use of a Proportional-Integral-Derivative (PID) Loop to maintain constant output pressure under variable load. The PID loop is implemented herein in an 8-bit microcontroller which contains several built-in Analog to Digital Converters (ADC's) as well as digital input and outputs. In this particular embodiment, output pressure of the turbine fan is monitored by one ADC using a commercial piezo-electric pressure sensor. A setpoint pressure is monitored by a second ADC which reads the voltage output of a potentiometer set by the operator. The PID loop uses these signals to calculate the appropriate phase angle for firing the TRIAC via a digital output pin of the microcontroller. The microcontroller also controls an LCD display to indicate turbine output pressure to the operator.

One key innovation of the controller is an "Idle-Down" feature described as follows. During product application the turbine fan's output airflow normally varies as the attached spray gun is triggered on and off by the operator. Relative changes in airflow are monitored using the error term of the PID loop. During periods of inactivity this error settles to zero which initiates a timer. After a period of inactivity, typically 30 seconds, the microcontroller puts the turbine fan into the Idle-Down state by programming the setpoint pressure to a low "Idle-Down" value (typically 2.5 psi or less). This reduced power level conserves energy, reduces heat and noise, and prolongs motor life during breaks in product application such as work piece adjustment, cup refilling, etc. The Idle-Down state is ended by a simple squeeze of the spray-gun trigger or adjustment of the pressure setpoint by the operator. These events cause abrupt changes in the PID error term and are detected by the microcontroller, which then exits the Idle-Down state and resumes normal operation.

The combination of the microcontroller and character-based LCD screen provides a robust human-machine interface (HMI) and allows the display of valuable diagnostics including turbine temperature and the number of hours the machine has been operated. These diagnostics alert the operator to change the air filter which is important to prolong machine life and minimize power consumption and temperature. System temperature is monitored by the microcontroller using a thermistor mounted to the turbine. Exceeding a factory-set threshold causes the LCD to flash a warning to the operator. If system temperature exceeds a second higher threshold the microcontroller shuts off power to the turbine and displays an over-temperature message on the LCD display. Power cannot be restored to the turbine until the machine has cooled off and been restarted by the toggling the system power.

Now in more detail, as seen in FIGS. 1, 2, 3B, 4B, 5, 6 and 7B an exemplary embodiment of the present invention includes a high volume low pressure (HVLP) turbine assembly 10 with a turbine assembly housing 12. The turbine assembly housing 12 may be made from a variety of materials and configurations. For example, the housing 12 may be made from metal, composites, plastic or any combination thereof. The housing 12 provides a nice interface for a user to see and interact with. A handle 14 is provided for easy transportation of the assembly 10.

A turbine 16 is disposed within the housing 12, where the turbine 16 includes a turbine fan 18 rotatable within a turbine casing 20. The turbine casing 20 has a turbine air inlet 22 and a turbine air outlet 24. The turbine 16 and turbine fan 18 may take the shape and size of a variety of configurations available in the marketplace. Currently, the most powerful turbine units available are called 5 stage turbines. This means that there are 5 separate sets of turbine blades of varying size that are designed to create the high volume low pressure flow needed.

A hose outlet fitting 26 is connected to the housing 12, where the hose outlet fitting 26 is in airflow communication with the turbine air outlet 24. The hose outlet fitting 26 is configured to be connectable to an air hose 28 for a spray gun 30.

An electric motor 32 is mechanically coupled to the turbine fan 18 and configured to rotate the turbine fan 18 inside the turbine casing 20. A microcontroller 34 is disposed within the housing 12, where the microcontroller 34 is electrically connected to the electric motor 32 and controls a speed of the electric motor 32. A power input 36 is electrically coupled to the microcontroller.

A pressure sensor 38 is in airflow communication with the turbine air outlet 24 where the pressure sensor 38 is electrically connected to the microcontroller 34. A variety of pressure sensors may be used by one skilled in the art. Herein, a preferred embodiment is to use a piezo-electric pressure sensor. Furthermore, the pressure sensor 38 may be coupled anywhere along the pressure side of the turbine fan 18 as long as the pressure sensor 38 is sensing the pressure on the exhaust side of the turbine unit 16. The pressure sensor 38 shown herein is a piezoelectric transducer that produces a voltage proportional to the pressure applied via tubing connected to turbine manifold.

An airflow sensing means 40 is also electrically connected to the microcontroller 34. The microcontroller 34 may include a proportional-integral-derivative loop 42 controlling the electric motor 32 and may be configured to maintain a constant output pressure under a variable demand load. The airflow sensing means 40 may include monitoring an error term of the proportional-integral-derivative loop 42, wherein a period of inactivity is indicated by the error term settling to substantially zero. A timer 44 is electrically connected to the microcontroller 34.

Figure 3A:
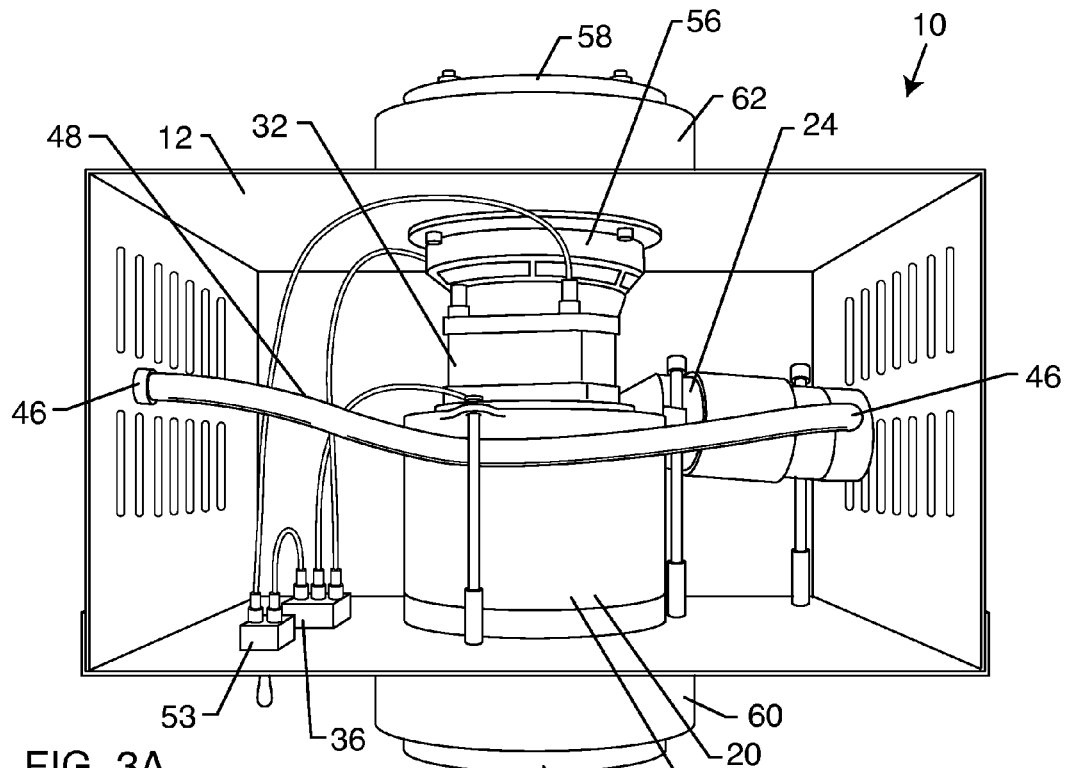
FIG. 3A is a top view of a prior art HVLP system.
Figure 4A:
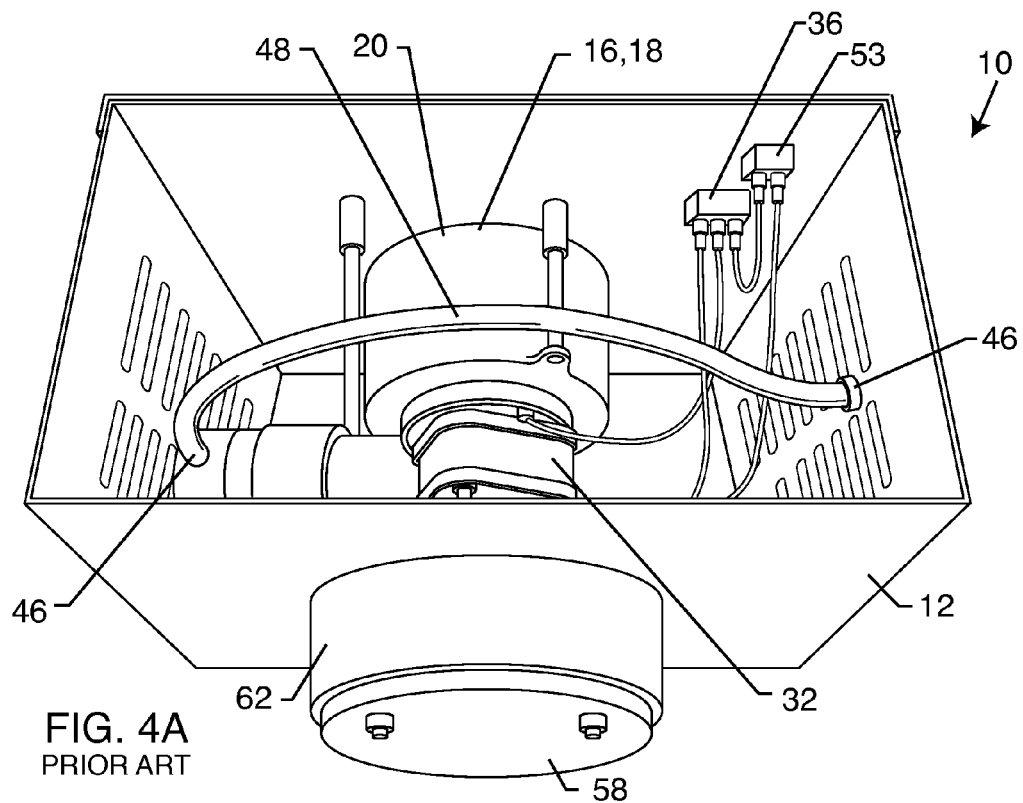
FIG. 4A is top perspective view of the prior art HVLP system of FIG. 3A from the back side.
Figure 7A:
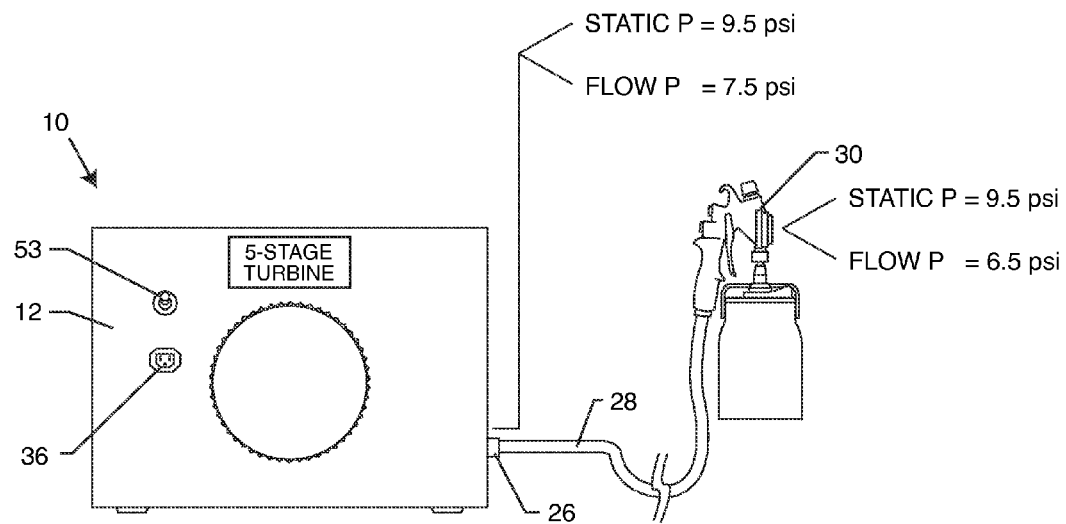
FIG. 7A is a schematic representation of a prior art HVLP system.

The HVLP turbine assembly 10 of the present invention does not have a bleeder port 46 in airflow communication with the turbine air outlet 24. FIGS. 3A, 4A and 7A show a similar system that does include a bleeder port 46. FIGS. 3A and 4A are prior art systems that include a bleeder port 46. In the prior art a bleeder tube 48 can be seen that ducts to the side of the housing 12 to bleed out into the surroundings/outwardly.

Figure 3B:
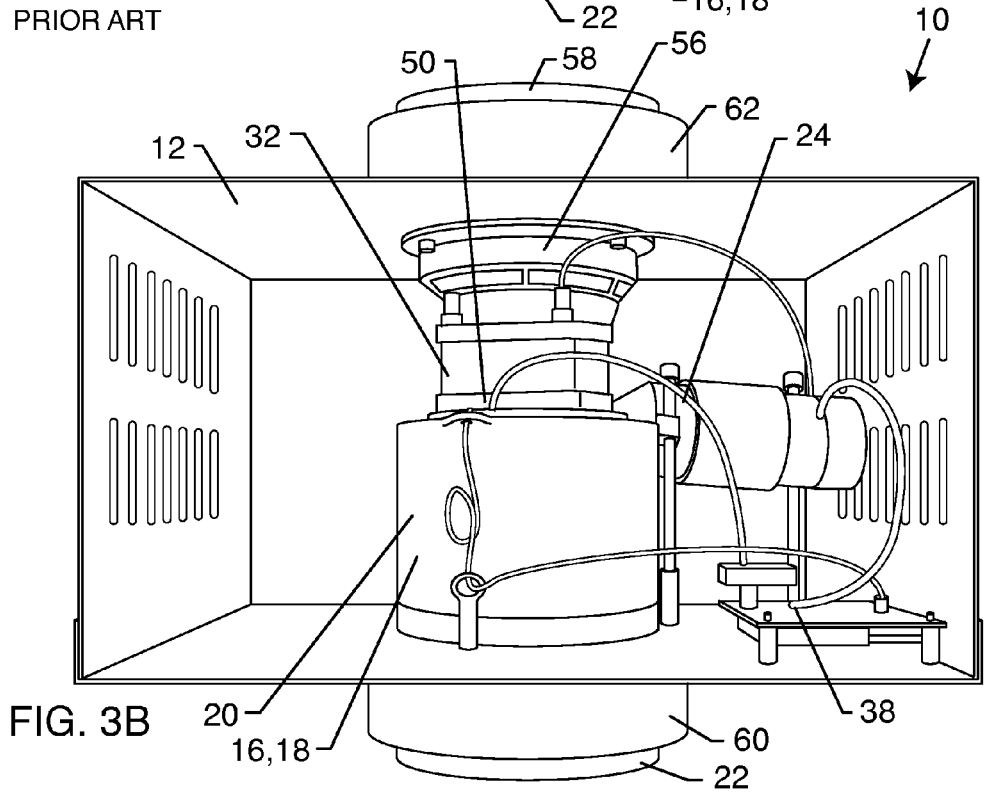
FIG. 3B is a top view similar to FIG. 3A now showing the HVLP system of the present invention.
Figure 4B:
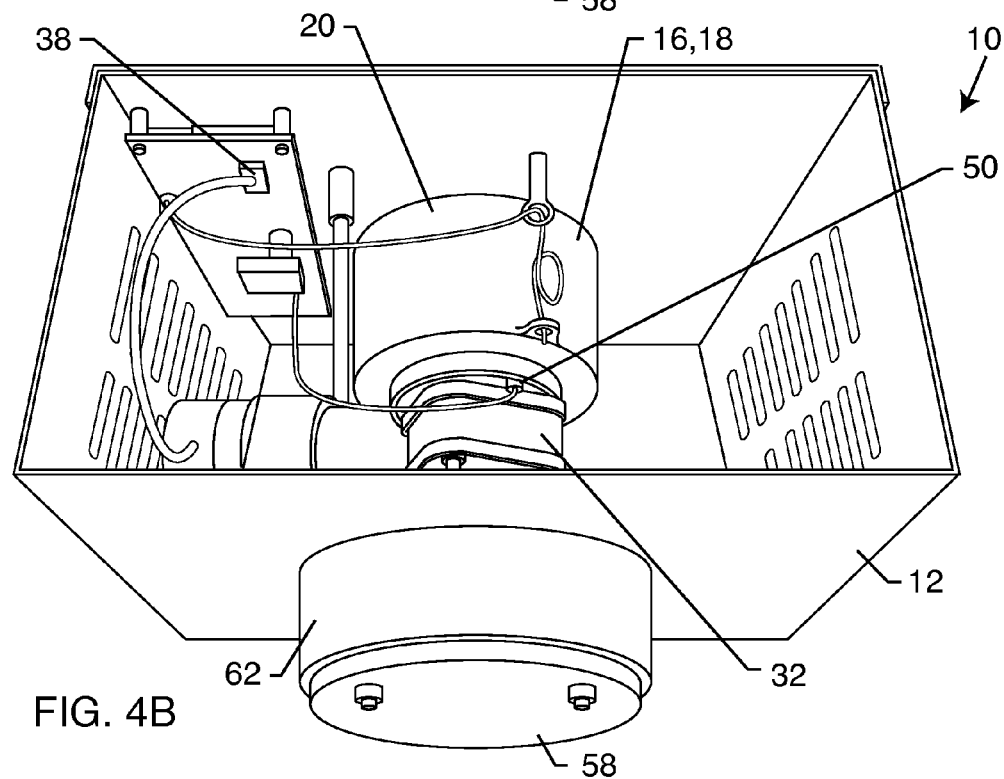
FIG. 4B is a top perspective view similar to FIG. 4A now showing the HVLP system of the present invention.

As shown in FIGS. 3B and 4B of the present invention, the bleeder port 46 has been removed. Therefore, the microcontroller 34 is configured to reduce the speed of the electric motor 32 to an idle speed after a predetermined time has elapsed, wherein the predetermined time is started when the airflow sensing means 40 indicates a period of inactivity. The predetermined time may be 5, 10, 15, 20, 25, 30 or 60 seconds or any combination thereof.

The idle speed may correspond to less than or equal to 2.5 psi of pressure in the turbine air outlet. Alternatively, the idle speed may correspond to any reduced pressure where a constant operation of the electric motor 32 and turbine fan 18 does not result in damage or unwantingly increased wear. The idle speed may correspond to 1.0, 1.5, 2.0 or 2.5 psi.

Furthermore, the microcontroller 34 may be configured to increase the speed of the electric motor 34 from the idle speed when an abrupt change in the error term of the proportional-integral-derivative loop 42 is detected. The abrupt change in the error term of the proportional-integral-derivative loop may include an adjustment of a pressure setpoint by the operator or a trigger pull on a spray gun 30 connected to the hose outlet fitting 26.

A temperature sensor 50 may be attached to the turbine casing 20 where the temperature sensor 50 may be electrically connected to the microcontroller 32. The microcontroller 32 may be configured to turn off the electric motor 32 if the temperature sensor senses an operating temperature above a predefined temperature threshold. Many types of temperature sensors 50 may be used by those skilled in the art. In a preferred embodiment disclosed herein, the temperature sensor 50 may be a thermistor. A thermistor head is used to connect an external thermistor to the microcontroller.

A graded switch control 52 may be connected to the housing 12 and be controllable by the operator, where the graded switch control 52 is electrically connected to the microcontroller 34 and controls the speed of the electric motor 32. An on/off switch 53 turns on and off the device 10. A display 54 may be used to show the pressure and other relevant data to the operator. The display 54 may be an LCD display or any other suitable type known to those skilled in the art. The LCD character display is used to display operating pressure, elapsed time, and status messages to the operator.

An auxiliary cooling fan 56 may be mechanically coupled to the electric motor 32, where the auxiliary cooling fan 56 is in airflow communication with an auxiliary cooling fan inlet 58 disposed in the housing 12, and where the auxiliary cooling fan 56 is configured to provide airflow to the electric motor 32 and/or turbine casing 20.

An air filter 60 may be coupled to the turbine air inlet 22 and configured to filter incoming air. A second air filter 62 may be coupled to the auxiliary cooling fan inlet 58 configured to filter incoming air.

Figure 5:
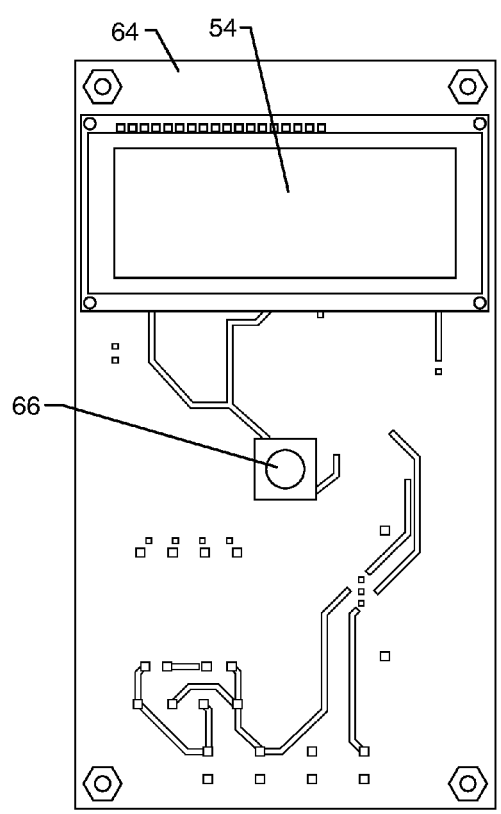
FIG. 5 is a front view of an exemplary electronics board of the present invention.
Figure 6:
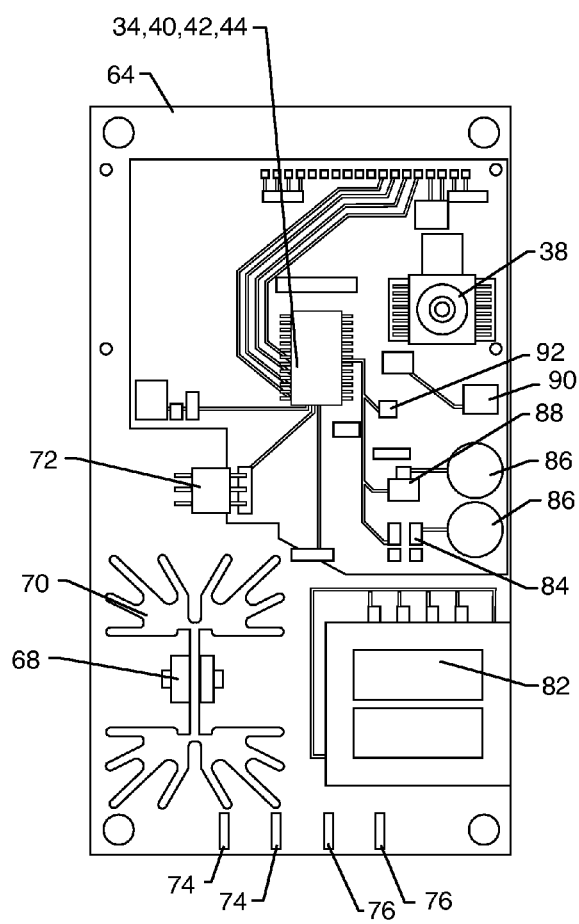
FIG. 6 is a rear view of the exemplary electronics board of FIG. 5.

FIG. 5 is a front view of an exemplary electronics board 64 of the present invention and FIG. 6 is a rear view of the exemplary electronics board 64 of FIG. 5. The graded switch control 52 is connected to the potentiometer 66. When the control 52 is rotated, it rotates the potentiometer 66 which then controls the electric motor 32. The potentiometer is used for selecting turbine set-point pressure by operator.

As shown herein, the microcontroller 34 is an 8-bit microcontroller. However, other types of microcontrollers could be used as well. The 8-bit microcontroller 34 is a programmable microcontroller that monitors pressure, time, and temperature, and executes the PID control algorithm and writes instructions to LCD display.

The electronics board 64 also has other various electronic components. The temperature TRIAC 68 is connected to a triac heat sink 70 to dissipate energy to the surrounding air. The TRIAC is a type of thyristor device used for phase control of AC power to turbine motor. The optocoupler 72 is used for galvanic isolation of the microcontroller firing signal from TRIAC. The motor out terminals 74 are located next to the power in terminals 76. The terminals can be standard spade terminals for a connecting unit to AC mains and the turbine motor.

As is seen in FIG. 1, the power is provided by an electrical cord 78 that plugs into an electrical socket 80, whether that socket 80 is 120 VAC or 240 VAC. A power transformer 82 is able to take the alternating current and transform it into direct current. The transformer 82, rectifying diodes 84, reservoir capacitors 86, and the 5V voltage regulator 88 are components that form a standard linear regulated DC power supply from AC mains voltage. The current limiting resistor 92 may be a zero-cross limiting resistor. The microcontroller requires an interrupt signal for each crossing of the AC mains waveform. This is accomplished using an input pin that is internally diode-protected. A resistor limits the current through the internal diode.

FIG. 7A is a schematic representation of a prior art HVLP system 10. In FIG. 7A, the static pressure at the house outlet fitting 26 is 9.5 psi while the flow pressure is 7.5 psi. This means that at the spray gun 30, the static pressure would still be at 9.5 psi but the flow pressure drops to 6.5 psi. One can see that about 1 psi was lost during flow from the hose outlet fitting 26 to the spray gun 30.

Figure 7B:
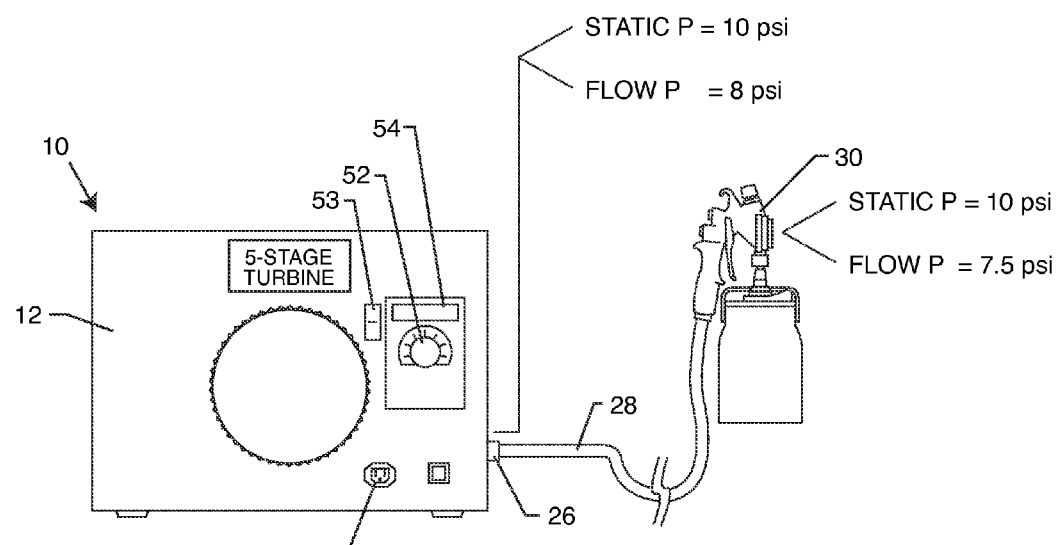
FIG. 7B is a schematic representation of the present invention's HVLP system.

FIG. 7B is a schematic representation of the present invention's HVLP system 10. Because there is no bleeder port 46 wasting pressurized air, the static pressure can now be 10 psi with the flow pressure being 8 psi at the hose outlet fitting 26. Furthermore, the flow pressure at the spray gun 30 can now be 7.5 psi. As compared to the prior art, there is around 1 psi extra as compared to a traditional HVLP turbine assembly. The increased flow pressure enables the present invention to deliver superior performance as compared to the prior art.

In summary, the present invention is about a feature for a spray gun named herein as "Throttle Back Control" or "Idle Down Control." Throttle Back Control eliminates the need for back pressure relief when connecting a non-bleed type spray gun to an HVLP turbine spray system. The present invention is significant because all (vacuum style) turbine motors must have back pressure relief when air is restricted or stopped. Serious motor issues (overheating, bearing failure) will occur when they are used with a non-bleed type spray gun. However, having a back pressure relief port wastes more than 0.5 psi, which can have significant effects on the spray finish results. Eliminating the back pressure relief will provide more available air pressure and better finish results. The present invention also now provides improved motor safety and longevity.

Throttle back control is a printed circuit board (PCB) or other electronic control device that controls the electric motor used to power an HVLP turbine system. Typically most HVLP turbine manufacturers build an air bleed port into a turbine system. Some drill a small hole in the side of the motor outlet and some attach a small manifold to attach a connector to relieve back pressure. Other manufacturers provide external air relief. If any of these air bleed ports were removed or blocked severe damage would occur to the high speed motor very quickly.

Throttle back control cuts the motor speed back to a safe speed where there will be no detriment to the motor. Rather than relieving the air pressure through a bleed port the present invention now cuts back the motor speed instantly to provide a safe way to operate the motor to its fullest potential. The maximum air pressure achieved with a 5-stage motor is typically 9.5 psi. Now with throttle back control we can now achieve a sealed pressure of 10 psi or more.

Throttle back control works when the operator does not use the trigger of the spray gun for more than a defined time period (e.g. 30 seconds) with the motor running which simulates a distraction or completion of the job. (The time period of 30 seconds is a representative value and can be adjusted by those skilled in the art as this disclosure is not limiting itself to just 30 seconds.) If the PCB senses that the air pressure has not changed in 30 seconds it will kick in the TBC, which slows the electric motor to a safe idle speed. This is the safe idle speed that has been approved by the motor manufacturer as being a speed that the motor can run at indefinitely without causing harm to the motor. Once the trigger is pulled on the spray gun the motor will immediately speed back up to its predetermined air pressure and speed.

There are additional novel features of the present invention. Additional features included in the PCB or electronic control device can be:

1. Thermal overload protection: When the motor reaches a preset temperature an "overheat" warning is displayed in the LCD screen. If the turbine continues to operate and a second preset temperature level is reached the turbine will shut down. The turbine will remain shut down until the motor has cooled to a sufficient level that it can again operate at a normal running temperature.

2. An overheat warning can also be displayed on the LCD screen when the motor may be above a certain temperature threshold. Furthermore, the LCD screen can display other messages, such as when the air filter needs cleaning or replacing.

3. Air Pressure (psi) Control: Most HVLP turbine systems are fixed pressure. When you turn them on they run at full speed giving you a continuous maximum air pressure. The present invention's PCB or electronic motor control now allows the operator to control the speed of the motor with a graded switch control allowing the operator to adjust the amount of air pressure. This is digitally displayed on an LCD, which is accurate to 1/10th of a psi.

4. Automatic Pressure calibration: There are no other HVLP turbine spray systems in the marketplace that have air pressure control (PSI) where a PCB monitors the motor speed to ensure the pressure is accurately controlled to 1/10th of a psi. Our PCB not only ensures that the motor will always give the most accurate pressure possible, it will do this at any barometric pressure. If you need 5 psi at sea level or at higher altitudes, you will always be assured of accurate pressure control.

Although several embodiments have been described in detail for purposes of illustration, various modifications may be made to each without departing from the scope and spirit of the invention. Accordingly, the invention is not to be limited, except as by the appended claims.

What is claimed is:

1. A high volume low pressure (HVLP) turbine assembly, comprising:
a turbine assembly housing;
a turbine disposed within the housing, the turbine comprising a turbine fan rotatable within a turbine casing, the turbine casing comprising a turbine air inlet and a turbine air outlet;
a hose outlet fitting connected to the housing, the hose outlet fitting in airflow communication with the turbine air outlet, where the hose outlet fitting is configured to be connectable to an air hose for a spray gun;
an electric motor mechanically coupled to the turbine fan and configured to rotate the turbine fan inside the turbine casing;
a microcontroller disposed within the housing, where the microcontroller is electrically connected to the electric motor and controls a speed of the electric motor;
a power input electrically coupled to the microcontroller;
a pressure sensor in airflow communication with the turbine air outlet, where the pressure sensor is electrically connected to the microcontroller;
an airflow sensing means electrically connected to the microcontroller;
a timer electrically connected to the microcontroller;
wherein the HVLP turbine assembly does not have a bleeder port in airflow communication with the turbine air outlet; and
wherein the microcontroller is configured to reduce the speed of the electric motor to an idle speed after a predetermined time has elapsed, wherein the predetermined time is started when the airflow sensing means indicates a period of inactivity.

2. The assembly of claim 1, wherein the microcontroller comprises a proportional-integral-derivative loop controlling the electric motor configured to maintain a constant output pressure under a variable demand load.

3. The assembly of claim 2, wherein the airflow sensing means comprises monitoring an error term of the proportional-integral-derivative loop, wherein the period of inactivity is indicated by the error term settling to substantially zero.

4. The assembly of claim 3, wherein the pressure sensor comprises a piezo-electric pressure sensor.

5. The assembly of claim 4, wherein the idle speed corresponds to less than or equal to 2.5 psi of pressure in the turbine air outlet.

6. The assembly of claim 5, wherein the microcontroller is configured to increase the speed of the electric motor from the idle speed when an abrupt change in the error term of the proportional-integral-derivative loop is detected.

7. The assembly of claim 6, wherein the abrupt change in the error term of the proportional-integral-derivative loop comprises an adjustment of a pressure setpoint by an operator or a trigger pull on the spray gun connected to the hose outlet fitting.

8. The assembly of claim 7, including a temperature sensor attached to the turbine casing, the temperature sensor electrically connected to the microcontroller.

9. The assembly of claim 8, wherein the microcontroller is configured to turn off the electric motor if the temperature sensor senses an operating temperature above a predefined temperature threshold.

10. The assembly of claim 9, wherein the temperature sensor comprises a thermistor.

11. The assembly of claim 10, including a graded switch control connected to the housing controllable by the operator, where the graded switch control is electrically connected to the microcontroller and controls the speed of the electric motor.

12. The assembly of claim 11, including an auxiliary cooling fan mechanically coupled to the electric motor, the auxiliary cooling fan in airflow communication with an auxiliary cooling fan inlet disposed in the housing, where the auxiliary cooling fan is configured to provide airflow to the electric motor and/or turbine casing.

13. The assembly of claim 12, including an air filter coupled to the turbine air inlet configured to filter incoming air.

14. The assembly of claim 13, including a second air filter coupled to the auxiliary cooling fan inlet configured to filter incoming air.

15. The assembly of claim 14, wherein the predetermined time comprises 30 seconds.

16. A high volume low pressure (HVLP) turbine assembly, comprising:
a turbine assembly housing;
a turbine disposed within the housing, the turbine comprising a turbine fan rotatable within a turbine casing, the turbine casing comprising a turbine air inlet and a turbine air outlet;
a hose outlet fitting connected to the housing, the hose outlet fitting in airflow communication with the turbine air outlet, where the hose outlet fitting is configured to be connectable to an air hose for a spray gun;
an electric motor mechanically coupled to the turbine fan and configured to rotate the turbine fan inside the turbine casing;
a microcontroller disposed within the housing, where the microcontroller is electrically connected to the electric motor and wherein the microcontroller comprises a proportional-integral-derivative loop controlling the electric motor configured to maintain a constant output pressure under a variable demand load;
a temperature sensor attached to the turbine casing, the temperature sensor electrically connected to the microcontroller, wherein the microcontroller is configured to turn off the electric motor if the temperature sensor senses an operating temperature above a predefined temperature threshold;
a power input electrically coupled to the microcontroller;
a pressure sensor in airflow communication with the turbine air outlet, where the pressure sensor is electrically connected to the microcontroller;
an airflow sensing means electrically connected to the microcontroller, and wherein the airflow sensing means comprises monitoring an error term of the proportional-integral-derivative loop, wherein a period of inactivity is indicated by the error term settling to substantially zero;
a timer electrically connected to the microcontroller;
wherein the microcontroller is configured to reduce the speed of the electric motor to an idle speed after a predetermined time has elapsed, wherein the predetermined time is started when the airflow sensing means indicates the period of inactivity; and
wherein the microcontroller is configured to increase the speed of the electric motor from the idle speed when an abrupt change in the error term of the proportional-integral-derivative loop is detected.

17. The assembly of claim 16, wherein the HVLP turbine assembly does not have a bleeder port in airflow communication with the turbine air outlet.

18. The assembly of claim 17, including a graded switch control connected to the housing controllable by the operator, where the graded switch control is electrically connected to the microcontroller and controls the speed of the electric motor.

19. A high volume low pressure (HVLP) turbine assembly, comprising:
- a turbine comprising a turbine fan rotatable within a turbine casing, the turbine casing comprising a turbine air inlet and a turbine air outlet, wherein the turbine air outlet comprises a hose outlet fitting where the hose outlet fitting is configured to be connectable to an air hose for a spray gun;
- an electric motor mechanically coupled to the turbine fan and configured to rotate the turbine fan inside the turbine casing;
- a microcontroller electrically connected to the electric motor and configured to control a speed of the electric motor;
- a power input electrically coupled to the microcontroller;
- a pressure sensor in airflow communication with the turbine air outlet, where the pressure sensor is electrically connected to the microcontroller;
- an airflow sensing means electrically connected to the microcontroller;
- a timer electrically connected to the microcontroller;
- wherein the microcontroller is configured to reduce the speed of the electric motor to an idle speed after a predetermined time has elapsed, wherein the predetermined time is started when the airflow sensing means indicates a period of inactivity;
- wherein the microcontroller comprises a proportional-integral-derivative loop controlling the electric motor configured to maintain a constant output pressure under a variable demand load; and
- wherein the airflow sensing means comprises monitoring an error term of a proportional-integral-derivative loop of the microcontroller, wherein the period of inactivity is indicated by the error term settling to substantially zero.

20. The assembly of claim 19, wherein the HVLP turbine assembly does not have a bleeder port in airflow communication with the turbine air outlet.

* * * * *